United States Patent [19]

Rader

[11] Patent Number: 4,499,243
[45] Date of Patent: Feb. 12, 1985

[54] METHOD OF TREATING DIENE RUBBER WITH AMINO- AND HYDROXY ARYL COMPOUNDS

[75] Inventor: Charles P. Rader, Akron, Ohio

[73] Assignee: Monsanto Company, St. Louis, Mo.

[21] Appl. No.: 549,032

[22] Filed: Nov. 7, 1983

[51] Int. Cl.³ .................... C08C 19/20; C08C 19/22
[52] U.S. Cl. .................... 525/333.1; 525/380; 525/382; 525/384
[58] Field of Search .................... 525/333.1, 384

[56] References Cited

U.S. PATENT DOCUMENTS 2,335,089 11/1943 Sibley .................... 524/345
2,360,864 10/1944 Fryling .................... 524/345
3,197,446 7/1965 Ziarnik et al. .................... 260/79.5

OTHER PUBLICATIONS

Chemical Abstracts reference 17290c—Structural Features of Rubbers Prepared During the Vulcanization of Chloroprene Rubbers by Different Vulcanizing Systems.

*Primary Examiner*—Christopher A. Henderson
*Attorney, Agent, or Firm*—Gordon B. Seward

[57] ABSTRACT

Treatment of diene rubber with a compound of the formula

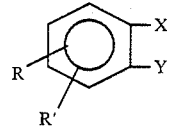

wherein X and Y are —OH or —NH$_2$ and R and R' are hydrogen, —OH, NH$_2$ or non-reactive substituents is performed at temperatures above 130° C. Rubber compositions treated in this manner exhibit increased green strength, decreased plasticity, and, when vulcanized, decreased hysteresis.

2 Claims, No Drawings

METHOD OF TREATING DIENE RUBBER WITH AMINO- AND HYDROXY ARYL COMPOUNDS

BACKGROUND OF THE INVENTION

This invention relates to a method for treating diene rubber to improve the properties of the rubber, and to rubber compositions having improved green strength or plasticity properties, or lower hysteresis when cured.

The introduction of synthetic diene rubber as a total or partial replacement for natural rubber in portions of pneumatic tires and other rubber articles presented problems in that the properties of the synthetic materials differed from that of natural rubber. Significant areas of difference concerned green strength and plasticity. Typically, unvulcanized synthetic diene rubber has significantly lower green strength and higher plasticity than does natural rubber. This difference has presented problems; for example, articles such as tires failed to maintain their structural integrity during handling and shaping prior to vulcanization. As a result, searching for improvements in the green strength and plasticity of rubber compounds containing synthetic rubber has been a continuing effort.

Synthetic polyisoprene has been produced which resembles natural rubber closely, consisting of essentially all cis-1,4-polyisoprene. Perhaps the most significant difference between synthetic polyisoprene and natural rubber is that the former has considerably less green strength. Thus, much of the effort toward green strength improvement concerns synthetic polyisoprene. Other synthetic diene rubbers which are widely used are polybutadiene and styrene-butadiene copolymer rubber (SBR).

Hysteresis in a cured (vulcanized) rubber compound is directly related to heat build-up. High-hysteresis rubber, on repeated flexing, rapidly heats up. In certain applications, such as in the treads of truck tires, the degree of heat build-up in use can be such that thick sections in the treads are degraded to the point of failure, resulting in separations and delaminations, often to the extent that the entire tread peels off the tire. The synthetic diene rubber in the tire normally exhibits higher hysteresis than natural rubber, so that even in blends with natural rubber the synthetic diene rubber gives compositions having a higher heat buildup than all-natural rubber compositions.

Efforts to improve the properties of diene rubber include the incorporation of nitrosoanilinoalkane compounds therein, as shown in U.S. Pat. Nos. 3,151,161 and 3,225,100. Problems of dispersion of these materials into rubber have been encountered, made more acute by the fact that relatively small amounts of them are generally used.

SUMMARY OF THE INVENTION

It is an object of this invention to provide a method of treating diene rubber so as to improve its properties of green strength, plasticity and hysteresis. It is an other object of this invention to provide an improved rubber composition, which shows increased green strength, decreased plasticity, or, when cured, reduced hysteresis.

These and other objects are realized in the instant invention by a method of treating diene rubber, in the presence of a modification-promoting amount of a compound of the formula

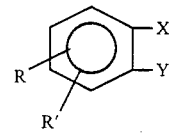

wherein X and Y are —OH or —NH$_2$ and R and R' are hydrogen, —OH, NH$_2$ or non-reactive substituents at an appropriate temperature above 130° C. for sufficient time to impart improved properties to the rubber.

The instant invention also resides in an improved diene rubber composition, which has been treated at an appropriate temperature above 130° C. with a modification-promoting amount of a compound as described above for sufficient time to impart improved properties to the rubber.

Non-reactive substituents in the compound of the invention are those substituents which have a negligible effect on the diene rubber when used in the method of the invention. Their presence on the ring is of no importance, however, compounds containing such substituents are effective in the method of the invention, and these compounds are within the scope of the invention. Among others, non-reactive substituents include —COOH, halogen or alkyl of 1-5 carbon atoms, and the substituents can be on any position of the ring not occupied by the —OH or —NH$_2$ groups indicated in the general structural formula above. One of the R's in that formula can be an additional —OH or —NH$_2$ group, as well.

Compounds of the invention include, for example, o-dihydroxybenzene (catechol), o-aminophenol, o-phenylenediamine, 3,4-dihydroxybenzoic acid, benzene-1,2,3-triol, benzene-1,2,4-triol, 3,4,5-trihydroxybenzoic acid, 4-chloro-1,2-dihydroxybenzene, 3,4-dihydroxy toluene and 4-ethyl-1,2-phenylenediamine.

The amount of the compound used will depend on the nature of the compound itself (activity, molecular weight, etc.), on the type of diene rubber to be treated, on the time and temperature employed and on the desired magnitude of the improvement in properties of the diene rubber.

Preferably, the compound is present in an amount of from 0.1 to 20 parts, and more preferably, from 0.2 to 5 parts by weight per 100 parts of diene rubber by weight.

Optionally, maleic acid or anhydride can be present in the diene rubber in addition to the compound, and will enhance the improvement of the properties of the rubber. If present, the maleic acid or anhydride is used in an amount of from 0.2-5 parts by weight per 100 parts of diene rubber by weight. An organic peroxide such as dicumyl peroxide can also be present, in an amount of from 0.1 to 1.0 parts by weight per 100 parts by weight of rubber.

Also optional is the incorporation of a small amount of sulfur or a vulcanization accelerator such as 2-mercaptobenzothiazole (MBT) or 2,2'-dithiobisbenzothiazole (MBTS) during the treatment. Relatively low amounts of sulfur should be used in order to avoid precure or scorch of the rubber. Generally, about 0.1 to 0.5 part of sulfur and about 0.2 to 1.0 part of accelerator is sufficient, with improved results realized in many instances.

By diene rubber is meant an elastomer which is a polymer from diene monomer, either a natural or synthetic polymer, including mixtures of two or more of natural and/or synthetic polymers. Natural diene rubber includes Hevea rubber (in the form of smoked sheet, crepe or other typical forms), guayule, and other naturally occurring diene rubbers. Synthetic polymers which are included in the definition of "diene rubber" include polymers from isoprene and butadiene, either homopolymers or copolymers with one or more comonomers, which can be dienes or other polymerizable materials. For example, copolymers of isoprene or butadiene with styrene, acrylonitrile, isobutylene, or unsaturated carboxylic acids and esters such as maleic, fumaric, itaconic, acrylic and methacrylic acids, and methyl-methacrylates are included. EPDM rubbers (polymers from ethylene, propylene and a non-conjugated diene monomer), butyl rubbers (polymers from isobutylene and a diene monomer) and chlorobutyl rubbers are also included.

The invention finds a particular utility in use with synthetic polyisoprene of a high cis-1,4 content, and with blends thereof with polybutadiene or SBR (styrene/butadiene copolymer rubber).

Treatment of the diene rubber means incorporating the compound into the rubber, with good dispersion, and maintaining the mixture at the appropriate temperature (above 130° C.) for sufficient time to permit the modification to occur. Preferably, the temperature should be at least 150° C., more preferably from 160° to 210° C. A convenient method of treating involves admixture of the compound into the rubber using the type of high-shear equipment normally used for mixing rubber, such as rubber mills, and preferably, internal mixers exemplified by Banbury mixers and the like. Such mixing produces a temperature rise in the rubber composition which can be controlled within the desired temperature range. Alternatively, the compound can be incorporated into the diene rubber at a relatively low temperature (below 130° C.) and then the mixture can be heated to the appropriate higher temperature and held for the required time.

Preferably, the treatment time will be from 0.1 to 20 minutes, and more preferably from 1 to 10 minutes. Shorter treatment times than the preferred minimum may result in insufficient improvement in the desired properties, and longer treatment times than the preferred maximum may be harmful to the rubber. As with the level of the compound, both optimum times and optimum temperatures for a specific compound can easily be determined by a limited number of experiments.

Other rubber compounding ingredients can optionally be present during the treatment, and the presence of carbon black and/or non-black fillers is preferred. Because of the conditions employed, however, the complete vulcanization system should preferably not be present during the treatment, as it could result in a premature curing or scorch of the diene rubber compound. If it is desired to have black or non-black fillers present in the diene rubber compound, particular advantage is realized by having the fillers present during the treatment step. This method can produce interaction between the fillers and the diene rubber so as to obtain better physical properties in the vulcanized compounds. These better physical properties are evidenced in improvements in hysteresis and stress-strain properties, among other properties.

Often, when treating the diene rubber, amounts of the compound will be substantially less than the maximum preferred levels set forth above, such as, for example, less than three parts by weight per 100 parts of diene rubber by weight; but higher amounts can be employed, especially if a "masterbatch" technique is used. This technique can involve treating only a portion of the diene rubber, then subsequently blending the untreated portion into the treated portion. From ten parts or less up to 1,000 parts or more additional rubber can be admixed to the treated rubber, as desired. The additional rubber can be the same as, or different from the rubber originally treated. The masterbatch technique can be effective in providing more efficient use of the masticating equipment, thus allowing higher throughput of rubber.

DETAILED DESCRIPTION

A more complete understanding of the invention may be realized by reference to the following examples, in which all parts are by weight, unless otherwise specified.

The compounds of the invention are well known in the art. Many are commercially available, and all of the preferred compounds are commercially available.

In evaluating the rubber compositions of the invention, one important measurement is their green strength. Green strength in an elastomer is its resistance, before vulcanization, to deformation or fracture.

Green strength measurements are performed using a standard tensile testing machine. Samples of the rubber composition to be tested are pressed into slabs approximately three millimeters in thickness, from which slab specimens are die-cut measuring about 20.3×2.4 cm. The specimens are bench marked (to a test length of 2.54 cm.) in the center, and the exact width and thickness is measured. Specimens are pulled at a crosshead speed of 50.8 cm. per minute, with the stress reported at 300% elongation and at 1200%, or break. Stress values are calculated based on the original cross-section area of each specimen. In most instances, the green strength of the masterbatch (before adding the final curatives) and that of the fully compounded rubber composition are measured.

The tensile set of the uncured rubber compound is another measurement which is indicative of its behavior during shaping. Tensile set is measured according to the procedure described in ASTM D-412, paragraph 13, and can be found in Volume 37 of the 1982 ASTM standards at page 62. Briefly, specimens are elongated 100%, held for 5 minutes, and then released. After an additional 5 minute rest period, the permanent elongation is measured, and the tensile set is calculated.

To evaluate hysteresis properties in a vulcanized rubber compound, the Lupke rebound test is used. This test is described in the Vanderbilt Rubber Handbook, 1968 Edition, pages 315 and 316.

The method of the invention is tested in a standard masterbatch formulation as set forth below:

| MATERIAL | WEIGHT |
| --- | --- |
| Synthetic Polyisoprene[1] | 100.0 |
| HAF Carbon Black, N330 | 50.0 |
| Circosol 4240 Oil | 5.0 |
| Zinc Oxide | 5.0 |
| Stearic Acid | 1.0 |
| Antidegradant[2] | 2.0 |
| TOTAL | 163.0 |

[1] Natsyn 2200
[2] N—(1,3-dimethylbutyl)-N'—phenyl-p-phenylenediamine

To the masterbatch is added a test compound, as follows. Masterbatch compounds are mixed and masticated in a laboratory Banbury mixer according to the following schedule:
1. Charge rubber and test compound; mix 1 minute.
2. Charge ½ of carbon black; mix 1 minute.
3. Charge oil and remainder of carbon black; mix 1 minute.
4. Charge remaining ingredients; mix 1 minute.
5. Sweep down; mix 1 minute.
6. Dump. Actual rubber temperature (using a needle thermocouple) should be 170°–210° C.

Masterbatch samples, mixed as above, are tested for uncured properties, such as green strength and tensile set. To the masterbatch is added, on a mixing mill, 2.0 parts by weight of sulfur and 0.8 parts by weight of an accelerator, t-butyl benzothiazolesulfenamide.

EXAMPLE I

In the standard formulation set forth above, catechol is compared with resorcinol and hydroquinone (the latter two compounds being outside the scope of the invention), using the mixing schedule described. The proportions and the test results are set forth in Table 1, with separate results for the masterbatch and for the complete compound, containing sulfur and accelerator.

TABLE I

| STOCK | A | B | C | D |
|---|---|---|---|---|
| Natsyn Formulation | 163.0 | → | → | → |
| Catechol | — | 1.0 | — | — |
| Resorcinol | — | — | 1.0 | — |
| Hydroquinone | — | — | — | 1.0 |
| Banbury Dump Temp., °C. | 196 | 203 | 202 | 205 |
| Sulfur | 2.0 | → | → | → |
| Accelerator | 0.8 | → | → | → |
| Green Strength | | | | |
| Masterbatch: | | | | |
| @ 300% Elongation, MPa | 0.19 | 0.18 | 0.20 | 0.20 |
| @ Break, MPa | 0.17 | 0.26 | 0.17 | 0.18 |
| Elongation at Break, % | 1200+ | 1200 | 1150 | 1200+ |
| Completed Compound: | | | | |
| @ 300% Elongation, MPa | 0.14 | 0.15 | 0.16 | 0.15 |
| @ Break, MPa | 0.11 | 0.16 | 0.10 | 0.12 |
| Elongation at Break, % | 1200+ | 1150 | 1150 | 1200+ |
| Lupke Rebound | | | | |
| 1st Rebound | 68.5 | 69.5 | 69 | 70 |
| 2nd Rebound | 35 | 34.5 | 36 | 36 |
| 5th Rebound | 18 | 17.5 | 19 | 18.5 |
| Tensile Set, % | | | | |
| Masterbatch | 50.0 | 43.5 | 55.0 | 50.0 |
| Completed Compound | 61.0 | 52.5 | 65.0 | 62.5 |

The results in Table I show that catechol gives property improvements over the control, as shown in substantially reduced tension set and significantly increased green strength at break. Resorcinol and hydroquinone were ineffective in improving the properties of the diene rubber over the control.

EXAMPLE II

Catechol was again investigated, alone and in combination with a peroxide (dicumyl peroxide, "DiCup 40C"), benzothiazyl disulfide (MBTS) and sulfur. The compounding variations and test results are set forth in Table II. The standard formulation is the same as that used in Example I.

TABLE II

| STOCK | E | F | G | H | I | J | K | L |
|---|---|---|---|---|---|---|---|---|
| Natsyn Formulation | 163.0 | → | → | → | → | → | → | → |
| Catechol | — | — | 0.5 | → | → | → | → | → |
| DiCup 40C | — | 1.0 | — | 0.2 | 0.5 | 1.0 | — | — |
| MBTS | — | — | — | — | — | — | 0.5 | — |
| Sulfur | — | — | — | — | — | — | — | 0.5 |
| Banbury Dump Tep., °C. | 205 | 203 | 204 | 204 | 204 | 204 | 204 | 204 |
| Sulfur | 2.0 | → | → | → | → | → | → | → |
| Accelerator | 0.8 | → | → | → | → | → | → | → |
| Green Strength | | | | | | | | |
| Masterbatch: | | | | | | | | |
| @ 300% Elong., MPa | 0.19 | 0.20 | 0.19 | 0.25 | 0.30 | 0.46 | 0.20 | 0.61 |
| @ Break, MPa | 0.17 | 0.33 | 0.33 | 0.64 | 0.73 | 0.91 | 0.35 | 1.18 |
| % Elongation | 1200+ | 670 | 1110 | 740 | 610 | 480 | 1000 | 460 |
| Completed Compound: | | | | | | | | |
| @ 300% Elong., MPa | 0.20 | 0.28 | 0.22 | 0.25 | 0.29 | 0.38 | 0.20 | 0.98 |
| @ Break, MPa | 0.19 | 0.44 | 0.29 | 0.54 | 0.72 | 0.84 | 0.34 | 1.57 |
| % Elongation | 1200+ | 670 | 1110 | 740 | 610 | 480 | 1000 | 460 |
| Lupke Rebound, | | | | | | | | |
| 5th Rebound | 17.5 | 21 | 19.5 | 24.5 | 24.5 | 24 | 19 | 27 |
| Tensile Set, % | | | | | | | | |
| Masterbatch | 59.0 | 36.5 | 47.5 | 37.5 | 27.5 | 19.0 | 49.0 | 12.5 |
| Completed Compound | 61.0 | 30.0 | 50.0 | 37.5 | 19.5 | 20.0 | 42.5 | 12.5 |

The results in Table II show that catechol is effective at the level of 0.5 phr in improving the properties of synthetic polyisoprene rubber. The additional presence of a small amount (0.2 to 1.0 phr) of dicumyl peroxide is effective along with the catechol, as is a small amount of sulfur or MBTS.

EXAMPLE III

The effects of sulfur by itself and together with catechol were investigated in the same manner as before, using the same synthetic polyisoprene masterbatch. The combination of a small amount of maleic acid with catechol was also tested. Data and results are set forth in Table III.

TABLE III

| STOCK | M | N | O | P | Q | R | S | T |
|---|---|---|---|---|---|---|---|---|
| Natsyn Formulation | 163.0 | → | → | → | → | → | → | → |
| Sulfur | 0.1 | → | 0.2 | → | 0.5 | → | — | 0.2 |

TABLE III-continued

| STOCK | M | N | O | P | Q | R | S | T |
|---|---|---|---|---|---|---|---|---|
| Catechol | — | 0.5 | — | 0.5 | — | 0.5 | — | 0.5 |
| Maleic Acid | — | — | — | — | — | — | 0.5 | → |
| Banbury Dump Temp., °C. | 206 | 206 | 206 | 206 | 204 | 206 | 206 | 205 |
| Sulfur | 2.0 | → | → | → | → | → | → | → |
| Accelerator | 0.8 | → | → | → | → | → | → | → |
| Green Strength | | | | | | | | |
| Masterbatch: | | | | | | | | |
| @ 300% Elong., MPa | 0.16 | 0.28 | 0.30 | 0.39 | 0.42 | 0.47 | 0.30 | 0.50 |
| @ Break, MPa | 0.16 | 0.55 | 0.48 | 0.63 | 0.72 | 0.78 | 0.50 | 0.92 |
| Elongation at Break | 1200+ | 700 | 660 | 510 | 510 | 490 | 720 | 470 |
| Complete Compound | | | | | | | | |
| @ 300% Elong., MPa | 0.18 | 0.20 | 0.23 | 0.25 | 0.30 | 0.37 | 0.18 | 0.47 |
| @ Break, MPa | 0.16 | 0.46 | 0.42 | 0.63 | 0.71 | 0.75 | 0.27 | 1.03 |
| Elongation at Break | 880 | 860 | 860 | 690 | 620 | 540 | 1200 | 510 |
| Lupke Rebound | | | | | | | | |
| 5th Rebound | 22.5 | 25.5 | 27.5 | 26.5 | 30 | 30 | 24 | 28.5 |
| Tensile Set, % | | | | | | | | |
| Masterbatch | 44.0 | 30.5 | 26.5 | 21.5 | 17.5 | 19.0 | 35.0 | 20.0 |
| Complete Compound | 53.0 | 46.5 | 44.5 | 25.5 | 29.0 | 28.5 | 53.0 | 27.5 |

The test results in Table III show that catechol by itself is effective in improving green strength, rebound and tensile set, and the combination of catechol with sulfur, maleic acid or both, is even more effective.

EXAMPLE IV

In a similar manner as before, the effects of the addition of o-phenylendiamine, o-aminophenol, benzene-1,2,3-triol, (pyrogallol) and benzene-1,2,4-triol to a synthetic polyisoprene rubber were examined. These additives were run with and without the additional presence of 1.0 phr dicumyl peroxide. The proportions and test results are set forth in Table IV.

TABLE IV

| STOCK | U | V | W | X | Y | Z | AA | AB |
|---|---|---|---|---|---|---|---|---|
| Natsyn Compound | 163.0 | → | → | → | → | → | → | → |
| o-Phenylendiamine | 0.5 | → | — | — | — | — | — | — |
| o-Aminophenol | — | — | 0.5 | → | — | — | — | — |
| Pyrogallol | — | — | — | — | 0.5 | → | — | — |
| Benzene-1,2,4-triol | — | — | — | — | — | — | 0.5 | → |
| DiCup 40C | — | 1.0 | — | 1.0 | — | 1.0 | — | 1.0 |
| Banbury Dump Temp., °C. | 205 | 203 | 203 | 203 | 204 | 203 | 203 | 204 |
| Sulfur | 2.0 | → | → | → | → | → | → | → |
| Accelerator | 0.8 | → | → | → | → | → | → | → |
| Green Strength | | | | | | | | |
| Masterbatch | | | | | | | | |
| @ 300% Elong., MPa | 0.25 | 0.51 | 0.23 | 0.83 | 0.33 | 1.12 | 0.29 | 0.81 |
| @ Break, MPa | 0.48 | 1.01 | 0.32 | 1.15 | 0.50 | 1.23 | 0.39 | 0.92 |
| Elongation, % | 1010 | 510 | 1100 | 380 | 800 | 320 | 960 | 340 |
| Complete Compound | | | | | | | | |
| @ 300% Elong., MPa | 0.20 | 0.42 | 0.20 | 0.47 | 0.21 | 0.58 | 0.20 | 0.55 |
| @ Break, MPa | 0.41 | 0.99 | 0.29 | 0.97 | 0.37 | 0.83 | 0.22 | 0.89 |
| Elongation, % | 1010 | 510 | 1100 | 380 | 800 | 320 | 960 | 340 |
| Lupke Rebound | | | | | | | | |
| 5th Rebound | 18 | 22 | 16.5 | 25 | 18.5 | 25 | 21 | 23.5 |
| Tensile Set, % | | | | | | | | |
| Masterbatch | 53.5 | 25.0 | 48.0 | 10.0 | 36.0 | 11.0 | 40.5 | 12.0 |
| Complete Compound | 59.5 | 33.5 | 52.5 | 15.0 | 46.0 | 21.0 | 46.0 | 10.5 |

The results in Table IV indicate that all of the tested compounds (each of which is within the scope of the invention) are effective in improving the green strength and hysteresis properties of the rubber. The additional presence of dicumyl peroxide intensifies this improvement in all cases.

EXAMPLE V

The method of the invention was explored using a styrene-butadiene copolymer rubber (SBR-1712) which contained 37.5 parts oil per 100 parts of rubber. The compounding ingredients and their amounts are listed in Table V. FLECTOL ® H is polymerized 1,2-dihydro-2,2,4-trimethylquinoline antidegradant. Catechol, o-phenylenediamine (OPD) and o-aminophenol (OAP) were tested together with dicumyl peroxide. Catechol and sulfur (0.5 phr) were also combined. Proportions of materials and test results are set forth in Table V.

TABLE V

| | AC | AD | AE | AF | AG |
|---|---|---|---|---|---|
| SBR 1712 | 137.5 | → | → | → | → |
| HAF Black N330 | 50.0 | → | → | → | → |
| Zinc Oxide | 5.0 | → | → | → | → |
| Stearic Acid | 2.0 | → | → | → | → |
| FLECTOL ® H | 1.0 | → | → | → | → |
| Catechol | — | 0.5 | — | — | 0.5 |
| OPD | — | — | 0.5 | — | — |
| OAP | — | — | — | 0.5 | — |
| DiCup 40C | — | 0.5 | → | → | — |
| Sulfur | — | — | — | — | 0.5 |
| Dump Temp., °C. | 202 | 204 | 204 | 204 | 204 |
| Sulfur | 2.5 | → | → | → | → |
| Accelerator | 1.2 | → | → | → | → |
| Green Strength | | | | | |
| Masterbatch: | | | | | |
| @ 300% Elong., MPa | 0.27 | 0.43 | 0.43 | 0.43 | 0.53 |
| @ Break, MPa | 0.07 | 0.38 | 0.40 | 0.36 | 0.57 |
| Elongation, % | 1200+ | 1070 | 1090 | 1110 | 1150 |

TABLE V-continued

|  | AC | AD | AE | AF | AG |
|---|---|---|---|---|---|
| Completed Compound |  |  |  |  |  |
| @ 300% Elong., MPa | 0.24 | 0.31 | 0.36 | 0.33 | 0.44 |
| @ Break, MPa | 0.13 | 0.17 | 0.19 | 0.09 | 0.51 |
| Elongation, % | 700 | 1120 | 1030 | 870 | 1200+ |
| Lupke Rebound |  |  |  |  |  |
| 5th Rebound | 13 | 14.5 | 14.5 | 13.5 | 15 |
| Tensile Set, % |  |  |  |  |  |
| Masterbatch | 29.0 | 23.5 | 20.0 | 21.0 | 15.5 |
| Complete Compound | 31.5 | 22.5 | 22.0 | 23.5 | 17.5 |

The test results in Table V show that, in an oil-extended SBR compound, the process of the invention is effective. Green strengths were markedly improved, as were tensile set values.

EXAMPLE VI

To evaluate carboxyl-substituted compounds of the invention, 3,4,5-trihydroxybenzoic acid (gallic acid) and 3,4-dihydroxybenzoic acid were tested in a synthetic polyisoprene rubber compound, with and without dicumyl peroxide. Both of the compounds showed activity in improving the green strength and tensile set properties of the rubber; in both instances, dicumyl peroxide was very effective as a co-agent.

The method of the invention has been shown to provide improved diene rubber compositions, useful in manufacturing tires, belts, hose and other products.

Although the invention has been illustrated by typical examples, it is not limited thereto. Changes and modifications of the examples of the invention herein chosen for purposes of disclosure can be made which do not constitute departure from the spirit and scope of the invention.

I claim:

1. A method for improving properties of diene rubber comprising masticating the rubber, in the presence of from 0.2 to 5 parts of catechol and from 0.1 to 0.5 parts of sulfur by weight per 100 parts diene rubber by weight at a temperature of from 160° to 210° C., for from 1 to 10 minutes.

2. A diene rubber composition which has been masticated at a temperature of at least 150° C. for from 0.1 to 20 minutes in the presence of from 0.1 to 20 parts by weight of catechol and from 0.1 to 0.5 parts of sulfur by weight per 100 parts diene rubber by weight.

* * * * *